US012634598B2

(12) United States Patent
Kikuchi et al.

(10) Patent No.: US 12,634,598 B2
(45) Date of Patent: May 19, 2026

(54) IMAGE CAPTURING APPARATUS, CONTROL METHOD THEREOF, AND STORAGE MEDIUM

(71) Applicant: CANON KABUSHIKI KAISHA, Tokyo (JP)

(72) Inventors: Hirotaro Kikuchi, Tokyo (JP); Shunichi Wakashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 18/773,192

(22) Filed: Jul. 15, 2024

(65) Prior Publication Data

US 2025/0030960 A1     Jan. 23, 2025

(30) Foreign Application Priority Data

Jul. 20, 2023     (JP) ................................. 2023-118517

(51) Int. Cl.
*H04N 25/618* (2023.01)
*H04N 25/766* (2023.01)
*H04N 25/78* (2023.01)

(52) U.S. Cl.
CPC ......... *H04N 25/618* (2023.01); *H04N 25/766* (2023.01); *H04N 25/78* (2023.01)

(58) Field of Classification Search
CPC .... H04N 25/618; H04N 25/766; H04N 25/78; H04N 25/704; H04N 25/778; H04N 25/46
See application file for complete search history.

(56) References Cited

U.S. PATENT DOCUMENTS

| | | | | |
|---|---|---|---|---|
| 11,445,138 B2 * | 9/2022 | Tomita | ................... | H03M 1/74 |
| 2009/0166513 A1 * | 7/2009 | Abe | ......................... | H04N 25/00 |
| | | | | 250/208.1 |
| 2015/0326806 A1 * | 11/2015 | Moriwaka | .............. | H04N 25/53 |
| | | | | 348/302 |
| 2021/0227159 A1 * | 7/2021 | Sambonsugi | ........ | H04N 25/709 |

FOREIGN PATENT DOCUMENTS

| | | |
|---|---|---|
| JP | 2009159271 A | 7/2009 |
| JP | 2021114676 A | 8/2021 |

* cited by examiner

*Primary Examiner* — Nhan T Tran
(74) *Attorney, Agent, or Firm* — Canon U.S.A., Inc. IP Division

(57) ABSTRACT

An image capturing apparatus includes a pixel portion in which pixels each including a photoelectric conversion element are arranged in a matrix, an AD converter arranged corresponding to each pixel column of the pixel portion and configured to convert a pixel signal acquired from the pixels into a digital signal, an addition circuit configured to add pixel signals of different N columns (N being an integer of 2 or more); and a control unit configured to use a plurality of AD converters corresponding to the N columns to perform AD conversion on the pixel signals added by the addition circuit, and, during the AD conversion, after a predetermined time has elapsed from start of the AD conversion, perform a control to switch some of the plurality of AD converters to an operation that reduces power consumption.

19 Claims, 11 Drawing Sheets

F I G. 1
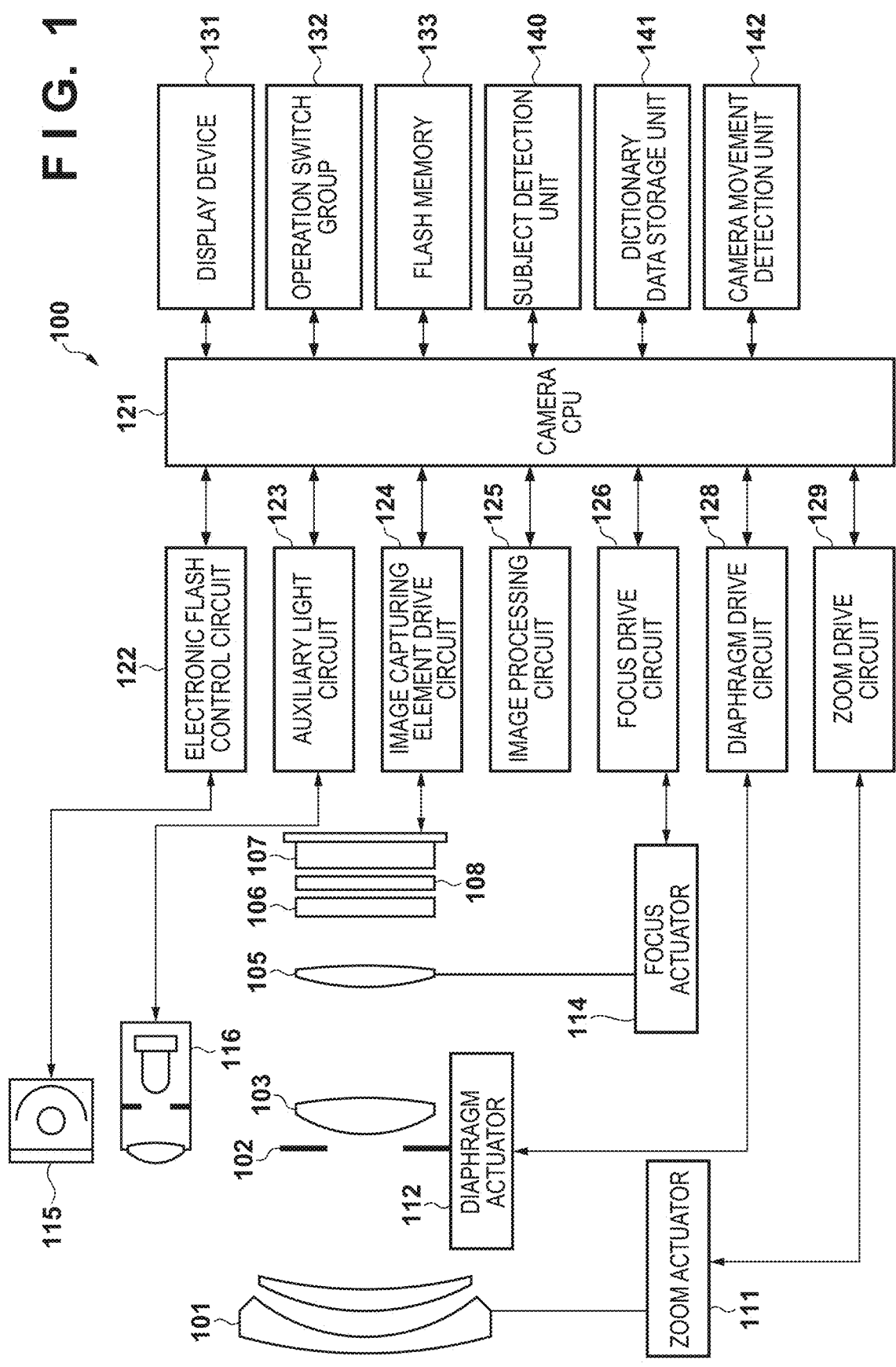

F I G. 3B

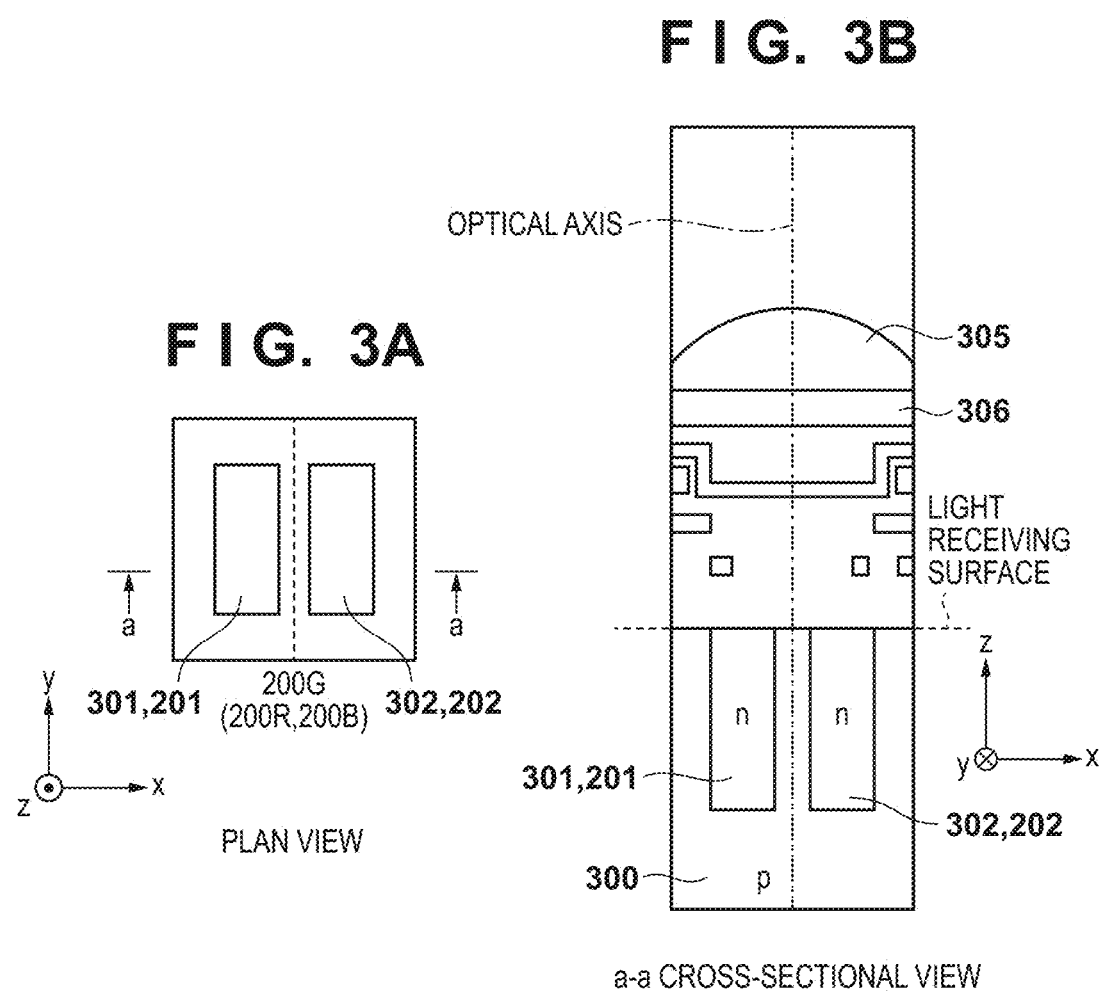

OPTICAL AXIS

305

306

LIGHT
RECEIVING
SURFACE

F I G. 3A a a y z x 301,201  200G
(200R,200B)  302,202

PLAN VIEW z y  x n  n 301,201

302,202

300  p a-a CROSS-SECTIONAL VIEW

F I G. 7
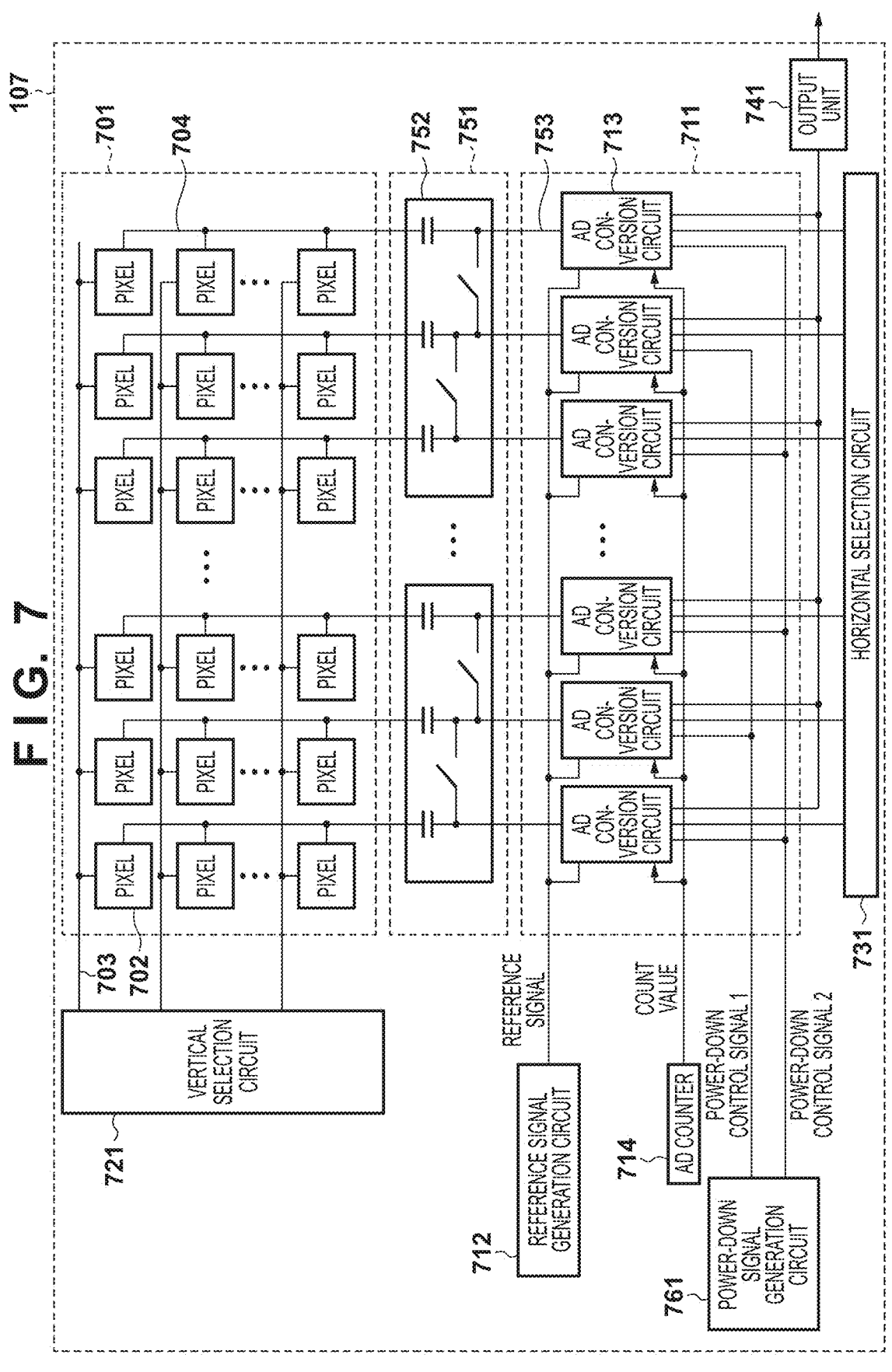

F I G. 10
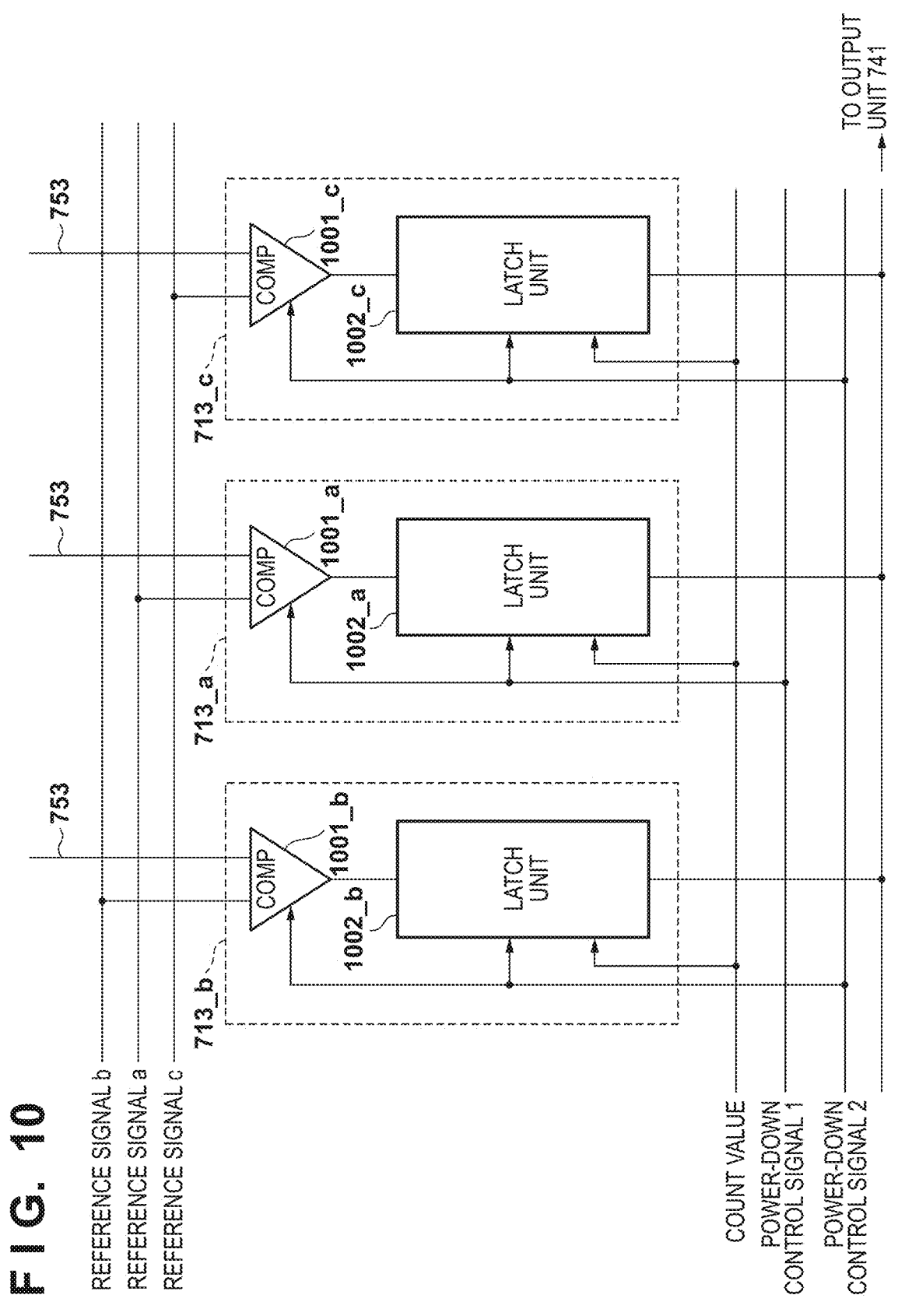

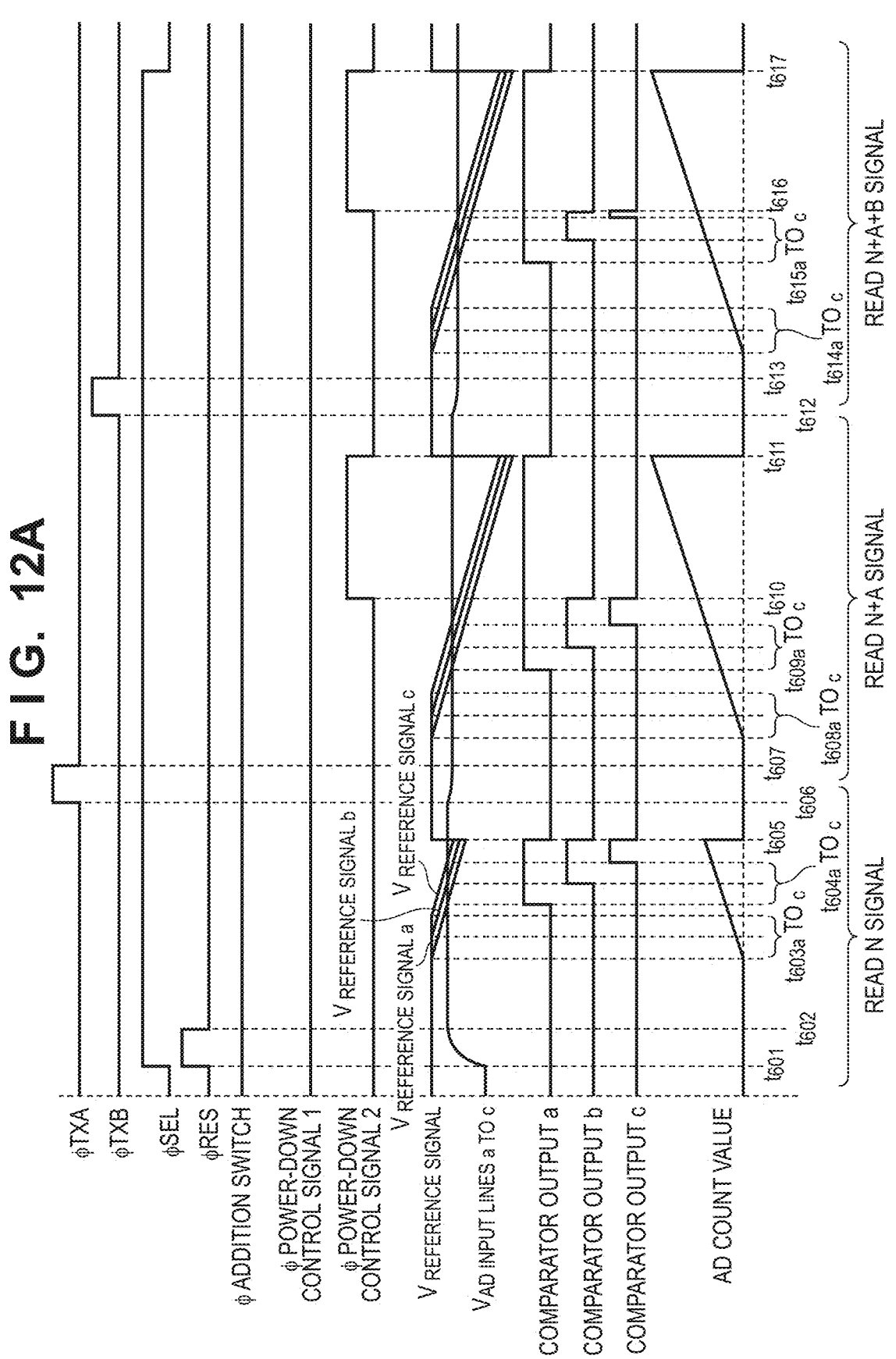
F I G. 12A

IMAGE CAPTURING APPARATUS, CONTROL METHOD THEREOF, AND STORAGE MEDIUM

BACKGROUND

Field

The present disclosure relates to an image capturing apparatus and a control method thereof.

Description of the Related Art

In recent years, image capturing elements such as CMOS image sensors have been widely used in image capturing apparatuses such as digital still cameras, digital video cameras, or the like.

Among such image capturing elements, those widely used lately have installed therein an Analog-to-Digital (AD) converter that performs AD conversion for each column of pixels arranged in a matrix, enabling high-speed reading of signals.

Here, there is known an AD conversion method that performs AD conversion by using a comparator arranged for each column to compare a pixel output voltage which has been output from each pixel with a reference signal whose voltage varies over time, and counting the time until the output of the comparator is inverted. Such a method is called a single-slope method.

Japanese Patent Laid-Open No. 2009-159271 discloses a configuration that reduces power consumption by operating a plurality of AD converters and saving power of the AD converters after completion of AD conversion. However, power of the AD converter is not saved under a high-luminance condition, which may result in a limited effect of reducing power consumption.

According to Japanese Patent Laid-Open No. 2021-114676, although power consumption is reduced by saving power of the AD converter only when reading a phase difference signal, the Signal to Noise (S/N) performance of the phase difference signal decreases at low luminance. In addition, power of the AD converter is not saved when reading an image capturing signal, which may lead to a limited effect of reducing power consumption.

With the configurations disclosed in Japanese Patent Laid-Open No. 2009-159271 and Japanese Patent Laid-Open No. 2021-114676, it has been difficult to reduce power consumption while suppressing reduction of the S/N performance of output signals, regardless of luminance.

SUMMARY OF THE DISCLOSURE

The present disclosure, which has been made in view of the aforementioned problems, provides an image capturing apparatus that can reduce power consumption while suppressing reduction of the S/N performance of output signals, regardless of luminance.

According to one embodiment of the present disclosure, there is provided an image capturing apparatus including: a pixel portion in which pixels each including a photoelectric conversion element are arranged in a matrix; an AD converter arranged corresponding to each pixel column of the pixel portion and configured to convert a pixel signal acquired from the pixels into a digital signal; an addition circuit configured to add pixel signals of different N columns (N being an integer of 2 or more); and at least one processor configured to function as: a control unit configured to use a plurality of AD converters corresponding to the N columns to perform AD conversion on the pixel signals added by the addition circuit, and, during the AD conversion, after a predetermined time has elapsed from start of the AD conversion, perform a control to switch some of the plurality of AD converters to an operation that reduces power consumption.

According to a second embodiment of the present disclosure, there is provided a method of controlling an image capturing apparatus comprising: a pixel portion in which pixels each including a photoelectric conversion element are arranged in a matrix; an AD converter arranged corresponding to each pixel column of the pixel portion and configured to convert a pixel signal acquired from the pixels into a digital signal; and an addition circuit configured to add pixel signals of different N columns (N being an integer of 2 or more), the method including: using a plurality of AD converters corresponding to the N columns to perform AD conversion on the pixel signals added by the addition circuit, and, during the AD conversion, after a predetermined time has elapsed from start of the AD conversion, performing a control to switch some of the plurality of AD converters to an operation that reduces power consumption.

Further features of the present disclosure will become apparent from the following description of exemplary embodiments with reference to the attached drawings.

BRIEF DESCRIPTION OF THE DRAWINGS

FIG. 1 illustrates a configuration of a digital camera, which is an embodiment of an image capturing apparatus of the present disclosure.

FIGS. 3A and 3B are a plan view and a cross-sectional view, respectively, of a pixel of an image capturing element.

FIG. 7 schematically illustrates an overall circuit configuration of an image capturing element used in an image capturing apparatus.

FIG. 10 illustrates a configuration of an AD conversion circuit of an image capturing element.

FIG. 12A is a read timing chart in an addition read mode of an image capturing element.

DESCRIPTION OF THE EMBODIMENTS

Figure 2:
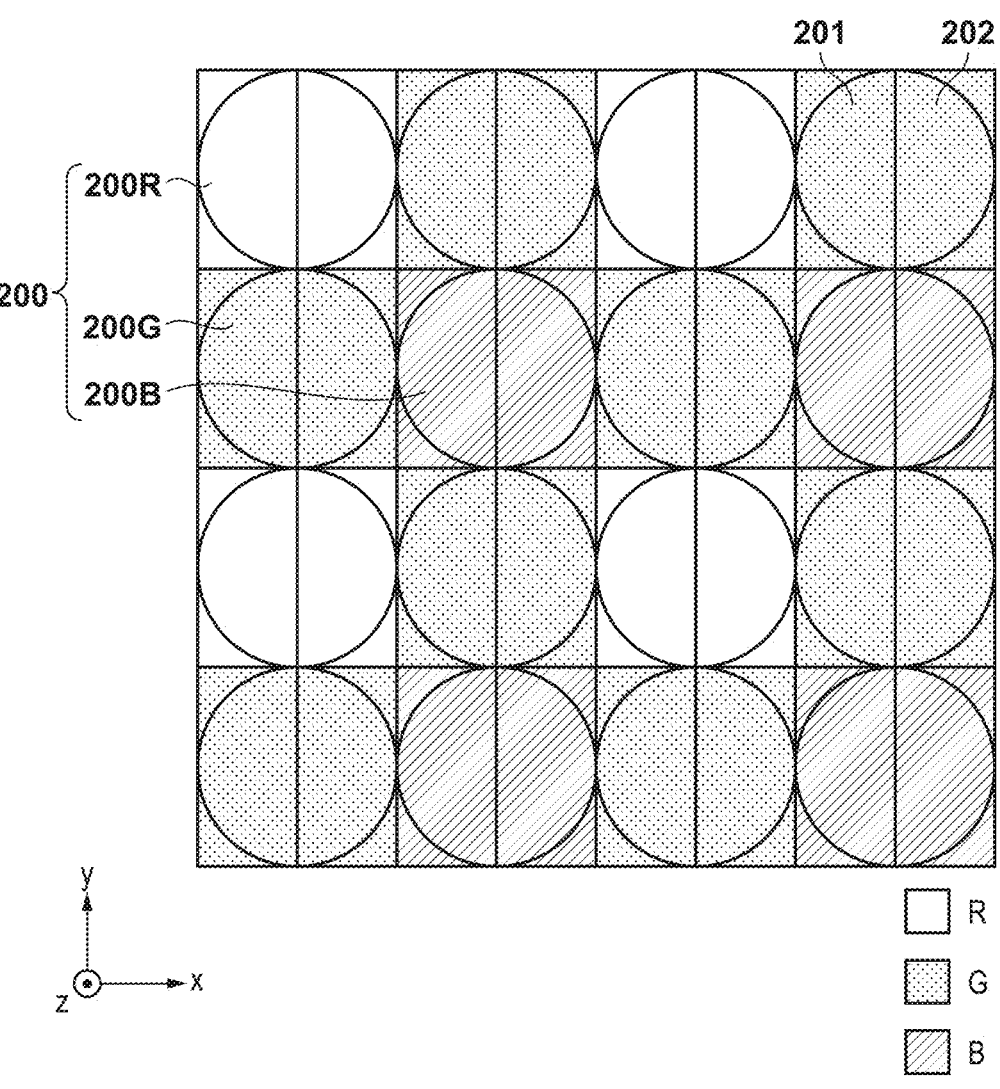
FIG. 2 illustrates a pixel array in an image capturing element.

Hereinafter, some example embodiments will be described in detail with reference to the attached drawings. Note, the following embodiments are not intended to limit the scope of the claimed invention. Multiple features are described in the embodiments, but limitation is not made to embodiments that require all such features, and multiple such features may be combined as appropriate. Furthermore, in the attached drawings, the same reference numerals are given to the same or similar configurations, and redundant description thereof is omitted.

FIG. 1 illustrates a configuration of a digital camera, which is an embodiment of an image capturing apparatus of the present disclosure.

In FIG. 1, a first lens group 101 is arranged closest to a subject (front side) in an image capturing optical system implemented as an imaging optical system, and movably held in the optical axis direction. A diaphragm 102 adjusts a light amount by adjusting the aperture diameter thereof. A second lens group 103 moves in the optical axis direction integrally with the diaphragm 102, and performs magnification change (zoom) together with the first lens group 101 moving in the optical axis direction.

A third lens group (focus lens) 105 moves in the optical axis direction to perform focus adjustment. An optical low-pass filter 106 is an optical element for reducing false color and moire of a captured image. The first lens group 101, the diaphragm 102, the second lens group 103, the third lens group 105, and the optical low-pass filter 106 together form the image capturing optical system.

A zoom actuator 111 changes magnification by rotating a cam barrel (not illustrated) about the optical axis to move the first lens group 101 and the second lens group 103 in the optical axis direction by a cam provided in the cam barrel. A diaphragm actuator 112 drives a plurality of light shielding blades (not shown) in an opening/closing direction for a light amount adjustment operation of the diaphragm 102. A focus actuator 114 moves the third lens group 105 in the optical axis direction to perform focus adjustment.

A focus drive circuit 126 drives the focus actuator 114 in response to a focus drive command from the camera CPU 121 to move the third lens group 105 in the optical axis direction. A diaphragm drive circuit 128 drives the diaphragm actuator 112 in response to a diaphragm drive command from the camera CPU 121. A zoom drive circuit 129 drives the zoom actuator 111 in accordance with a zoom operation performed by the user.

Here, a case will be described in the present embodiment where the image capturing optical system, the actuators 111, 112 and 114, and the drive circuits 126, 128 and 129 are provided integrally with a camera body 100 including an image capturing element 107. However, an exchangeable lens having the image capturing optical system, the actuators 111, 112 and 114, and the drive circuits 126, 128 and 129 may be configured to be attachable to and detachable from the camera body 100.

An electronic flash 115, including light emitting elements such as xenon tubes or LEDs, illuminates the subject. An electronic flash control circuit 122 performs a control to turn on the electronic flash 115 in synchronization with the imaging operation. An AF auxiliary light emitting unit 116 improves the focus detection performance on a dark-contrast or low-contrast subject by projecting an image of a mask having a predetermined aperture pattern onto a subject through a light projection lens. An auxiliary light drive circuit 123 performs a control to turn on the AF auxiliary light emitting unit 116 in synchronization with the focus detection operation.

A camera CPU 121 performs a variety of control on the camera body 100. The camera CPU 121 has a calculation unit, a ROM, a RAM, an A/D converter, a D/A converter, a communication interface circuit, or the like. The camera CPU 121 drives various circuits in the camera body 100, or controls a series of operation such as AF, image capturing, image processing and recording, in accordance with computer programs stored in the ROM.

The image capturing element 107 is formed of a two-dimensional CMOS sensor including a plurality of pixels and a peripheral circuit thereof, and arranged on an imaging plane of the image capturing optical system. The image capturing element 107 photoelectrically converts a subject image formed by the image capturing optical system. The image capturing element drive circuit 124 drives the image capturing element 107.

A shutter 108 has a focal plane shutter and drives the focal plane shutter in response to a command from a shutter drive circuit built in the shutter 108, based on an instruction from the camera CPU 121. The shutter 108 shields the image capturing element 107 from light while reading a signal of the image capturing element 107. In addition, the shutter 108 keeps the focal plane shutter open during exposure and guides the imaging light beam to the image capturing element 107.

The image processing unit 125 applies a predetermined series of image processing on image data stored in the RAM installed in the camera CPU 121. The series of image processing to be applied by the image processing unit 125 includes so-called image processing such as white balance adjustment, color interpolation (demosaicing) or gamma correction, as well as signal format conversion, scaling, or the like, without being limited thereto. Furthermore, the image processing unit 125 determines a main subject based on posture information of the subject and position information of an object specific to a scene (referred to as specific object in the following). The result of determination may be used for other image processing such as white balance adjustment, for example. The image processing unit 125 stores, in the RAM installed in the camera CPU 121, positions of joints of each subject, position and size information of the specific object, the centroid of a subject determined to be the main subject, position information of faces and pupils, or the like of the processed image data.

A display device 131, including display elements such as LCDs, displays information related to the image capture mode of the camera body 100, a preview image before image capturing, a confirmation image after image capturing, an index of a focus detection individual region, an in-focus image, or the like. The present embodiment uses two types of display devices, i.e., an electronic viewfinder (EVF) and a rear display. An operation switch group 132, including a main (power supply) switch, a release (image capture trigger) switch, a zoom operation switch, an image capture mode selection switch, or the like, is operated by the user. The flash memory 133 records the captured image. The flash memory 133 is attachable to and detachable from the camera body 100.

A subject detection unit 140 detects a subject based on dictionary data generated by machine learning.

The dictionary data storage unit 141 stores dictionary data for each subject. The subject detection unit 140 estimates the position of the subject in the image based on the imaged image data and the dictionary data. The subject detection unit 140 may estimate the position, size, reliability, or the like of the subject and output the estimated information. The subject detection unit 140 may output other information.

A camera movement detection unit 142 detects a panning operation and a tilt operation performed by a user in order to hold the camera and keep the subject within the image capturing range, together with camera shake which is not intended by the user. The camera movement detection unit

142 uses an acceleration sensor and an angular velocity sensor to detect any change of the camera position in six axis directions.

Next, there will be described a pixel array in the image capturing element 107, referring to FIG. 2. FIG. 2 illustrates a pixel array in a range of 4 pixel rows×4 pixel columns in the image capturing element 107 as viewed from the optical axis direction (z direction).

A single pixel unit 200 includes four image capturing pixels arranged as 2 rows×2 columns. A photoelectric conversion of a two dimensional subject image can be performed by arranging a large number of pixel units 200 on the image capturing element 107. At the upper left of the single pixel unit 200, there is provided an image capturing pixel 200R having (red) spectral sensitivity (referred to as R-pixel in the following), and at the upper right and the lower left, there is provided an image capturing pixel 200G having G (green) spectral sensitivity (referred to as G-pixel). Furthermore, at the lower right, there is provided an image capturing pixel 200B having B (blue) spectral sensitivity (referred to as B-pixel in the following). In addition, each image capturing pixel is divided into two halves in the horizontal direction (x direction), forming a first focus detection pixel 201 and a second focus detection pixel 202 configured to output signals for detecting the focus state.

In the image capturing element 107 of the present embodiment, a pixel pitch P of the image capturing pixel is 4 μm, with a total number N of about 20.75 million image capturing pixels arranged in 5575 columns in the horizontal (x) direction×3725 rows in the vertical (y) direction. In addition, the pixel pitch PAF of the focus detection pixels is 2 μm, with a total number NAF of about 41.5 million focus detection pixels arranged in 11150 columns in the horizontal direction×3725 rows in the vertical direction. In the present embodiment, a case where each image capturing pixel is divided into two in the horizontal direction will be described, but each image capturing pixel may be divided in the vertical direction.

FIG. 3A illustrates a single image capturing pixel 200G (200R, 200B) as viewed from the light receiving surface side (+z direction) of the image capturing element 107. FIG. 3B illustrates an a-a cross section of the image capturing pixel in FIG. 3A as viewed from the −y direction. As illustrated in FIG. 3B, one image capturing pixel is provided with one microlens 305 for collecting incident light.

In addition, the image capturing pixel has provided thereon a photoelectric conversion units (photoelectric conversion elements) 301 and 302 divided into N (two in the present embodiment) parts in the x direction. The photoelectric conversion units 301 and 302 correspond to the first focus detection pixel 201 and the second focus detection pixel 202, respectively. The centroids of the photoelectric conversion units 301 and 302 are decentered toward the −x side and the +x side with respect to the optical axis of the microlens 305.

An R-, G- and B-color filter 306 is provided between the microlens 305 and the photoelectric conversion units 301 and 302 in each image capturing pixel. The spectral transmittance of the color filter may be changed for each photoelectric conversion unit, or the color filter may be omitted.

The light entered into the image capturing pixel from the image capturing optical system is collected by the microlens 305, dispersed by the color filter 306, and subsequently photoelectrically converted by the photoelectric conversion units 301 and 302.

Figure 4:
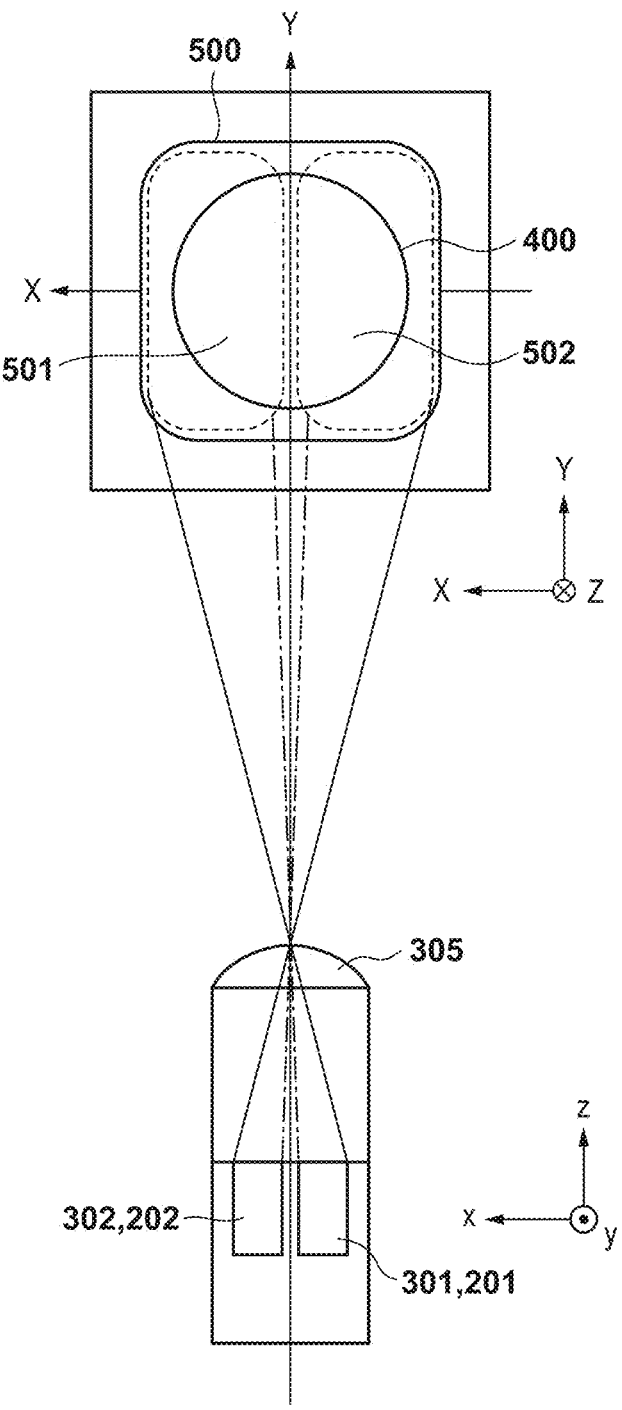
FIG. 4 is an explanatory diagram of a pixel structure of an image capturing element.

Next, there will be described a relation between the pixel structure and pupil division illustrated in FIGS. 3A and 3B, referring to FIG. 4. FIG. 4 illustrates, together with the exit pupil of the image capturing optical system, the a-a cross section of the image capturing pixel illustrated in FIG. 3A as viewed from the +y side. In FIG. 4, the x axis direction and the y axis direction of the image capturing pixel are reversed with respect to FIG. 3B, in order to keep consistency with the coordinate axis of the exit pupil.

A first pupil region 501 whose centroid has been decentered toward the +X side in the exit pupil is a region that the microlens 305 has brought into a generally conjugate relation with the light receiving surface of the photoelectric conversion unit 301 at the −x side in the image capturing pixel. The light flux that has passed through the first pupil region 501 is received by the photoelectric conversion unit 301, that is, the first focus detection pixel 201. In addition, a second pupil region 502 whose centroid has been decentered toward the −X side in the exit pupil is a region that the microlens 305 has brought into a generally conjugate relation with the light receiving surface of the photoelectric conversion unit 302 at the +x side in the image capturing pixel. The light flux that has passed through the second pupil region 502 is received by the photoelectric conversion unit 302, that is, the second focus detection pixel 202. A pupil region 500 indicates a pupil region that can receive light via the entire image capturing pixel including all the photoelectric conversion units 301 and 302 (the first and the second focus detection pixels 201 and 202).

Figure 5:
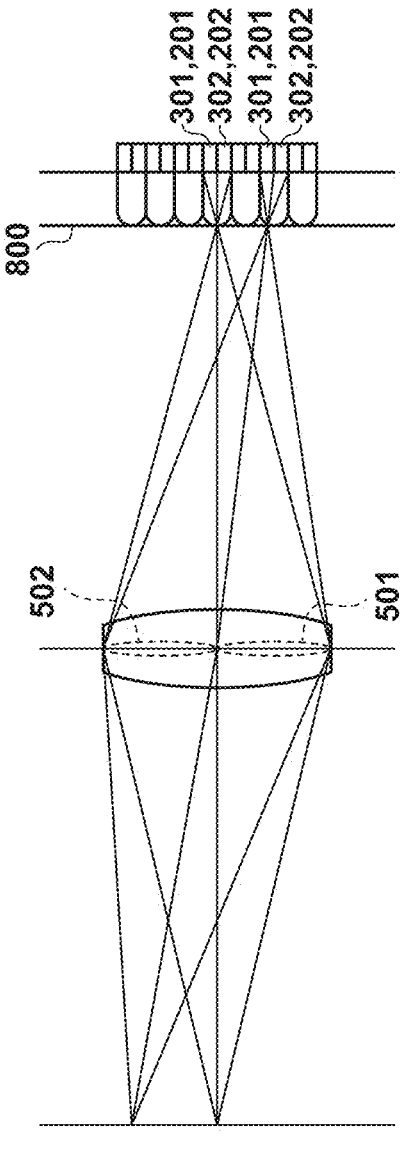
FIG. 5 is an explanatory diagram of pupil division in an embodiment.

FIG. 5 illustrates pupil division by the image capturing element 107. A pair of light fluxes each having passed through the first pupil region 501 and the second pupil region 502 enters each pixel of the image capturing element 107 at different angles to be received by the first and the second focus detection pixels 201 and 202 divided into two halves. In the present embodiment, output signals from the plurality of first focus detection pixels 201 of the image capturing element 107 are collected to generate a first focus detection signal, and output signals from the plurality of second focus detection pixels 202 are collected to generate a second focus detection signal. Additionally, in each of a plurality of image capturing pixels, an output signal from the first focus detection pixel 201 and an output signal from the second focus detection pixel 202 are added to generate an image capturing pixel signal. Image capturing pixel signals from the plurality of image capturing pixels are synthesized to generate an image of a resolution corresponding to the number N of effective pixels.

Next, there will be described a relation between a defocus amount of the image capturing optical system and a phase difference (image shift amount) between the first focus detection signal and the second focus detection signal acquired from the image capturing element 107, referring to FIG. 6.

Figure 6:
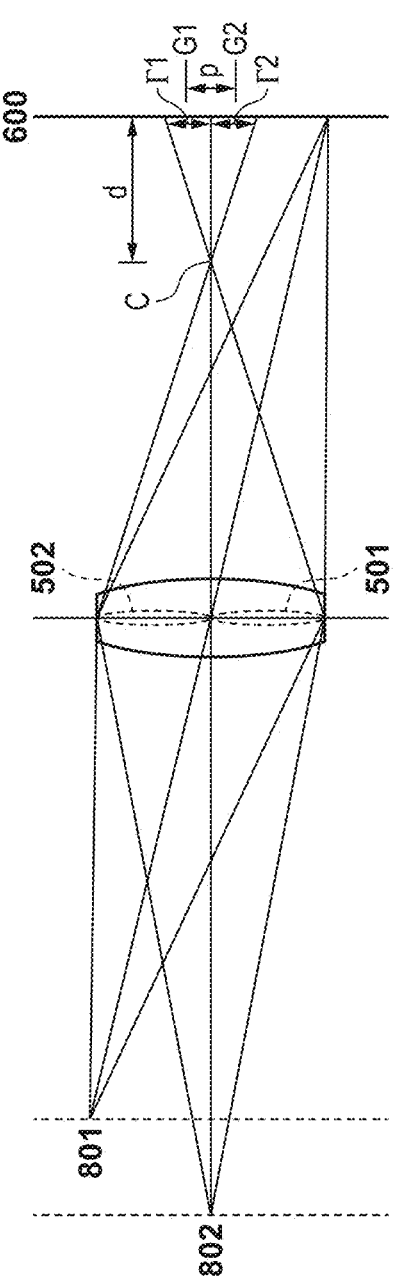
FIG. 6 illustrates a relation between defocus amount and image shift amount in an embodiment.

An imaging plane 600 illustrated in FIG. 6 has the image capturing element 107 provided thereon, with the exit pupil of the image capturing optical system being divided into two regions, namely the first pupil region 501 and the second pupil region 502, as has been described referring to FIGS. 4 and 5. The defocus amount d is defined such that a distance (magnitude) from the image position C of the light flux from the subject (801, 802) to the imaging plane 600 is |d|, and a front focus state where the image position C is closer to the subject side than the imaging plane 600 is represented by a negative sign (d<0), and a back focus state where the image position C is on the side opposite of the imaging plane 600 from the subject is represented by a positive sign (d>0). In the in-focus state where the image position C is on the imaging plane 600, d=0. The image capturing optical system is in an in-focus state (d=0) with respect to the subject 801 and is in a front focus state (d<0) with respect to the subject 802. The front focus state (d<0) and the back focus state (d>0) are collectively referred to as a defocus state (|d|>0).

In the front focus state (d<0), the light flux that has passed through the first pupil region 501 (second pupil region 502) among the light fluxes from the subject 802 is once collected and subsequently spreads as large as a width Γ1 (Γ2) centered around a centroid position G1 (G2) of the light flux, forming a blurred image on the imaging plane 600. The blurred image is received by each first focus detection pixel 201 (each second focus detection pixel 202) on the image capturing element 107, and a first focus detection signal (second focus detection signal) is generated. In other words, the first focus detection signal (the second focus detection signal) turns out to be a signal representing an image of the subject 802 blurred by a degree of blur Γ1 (Γ2) at the centroid position G1 (G2) of the light flux on the imaging plane 600.

The blur width Γ1 (Γ2) of the subject image increases substantially in proportion to an increase in the magnitude |d| of the defocus amount d. Similarly, the magnitude |p| of the image shift amount p (=the difference G1–G2 between the centroid positions of the light fluxes) between the first focus detection signal and the second focus detection signal also increases substantially in proportion to the increase in the magnitude |d| of the defocus amount d. Even in the back focus state (d>0), the image shift direction between the first focus detection signal and the second focus detection signal is opposite to that in the front focus state, but is similar.

As described above, the magnitude of the image shift amount between the first and second focus detection signals increases as the magnitude of the defocus amount increases. The present embodiment performs focus detection based on imaging plane phase difference detection to calculate the defocus amount from the image shift amount between the first and the second focus detection signals acquired using the image capturing element 107.

[Overall Configuration of Image Capturing Element]

FIG. 7 schematically illustrates an overall circuit configuration of an image capturing element used in the image capturing apparatus of the present embodiment.

The image capturing element 107 includes a pixel array unit 701, an AD conversion unit 711, a vertical selection circuit 721, a horizontal selection circuit 731, an output unit 741, and a signal addition unit 751.

The pixel array unit 701 has pixels 702 (corresponding to one of the pixels 200R, 200G, and 200B in FIG. 2) arranged in a two-dimensional array. Inputting the output of the vertical selection circuit 721 to the pixels aligned in the row direction via a pixel driving pulse wiring line 703 turns on the pixel selection switch of a predetermined row, whereby the amplification transistor of the predetermined row is connected to a column output line 704.

The column output line 704 can be provided in any of the following manner: one for each pixel column; one for each of a plurality of pixel columns; or more than one for each pixel column. In addition, the column output line 704 is input to the AD conversion unit 711 via signal addition circuits 752 provided for every three columns.

The signal addition circuits 752 are connected to the AD conversion circuit unit 111 via as many AD input lines 753 as an integral multiple of the number of the column output lines 704 input thereto. The signal addition circuits 752 have a non-addition mode in which a voltage across the column output line 704 is output to the AD input line 753 without adding-and-averaging, and an addition mode in which a voltage resulted from averaging the voltages across adjacent or nearby column output lines is output to the AD input line 753.

The AD conversion unit 711, having provided therein approximately as many AD conversion circuits 713 as the column output lines 704, performs AD conversion of the voltage output from the signal addition circuit 752. The AD conversion unit 711 includes a reference signal generation circuit 712, the AD conversion circuits 713 arranged for each column output line, an AD counter 714, and a power-down signal generation circuit 761.

In the pixel signal read operation, an output voltage of pixels of a row selected by the vertical selection circuit 721 is converted into a digital signal by the AD conversion circuit 713, and signals of columns sequentially selected by the horizontal selection circuit 731 are output to the outside of the image capturing element 107 via the output unit 741. Performing the pixel signal read operation sequentially while changing the row to be selected by the vertical selection circuit 721 allows for reading two-dimensional pixel signals from the image capturing element 107.

[Pixel Circuit]

Figure 8:
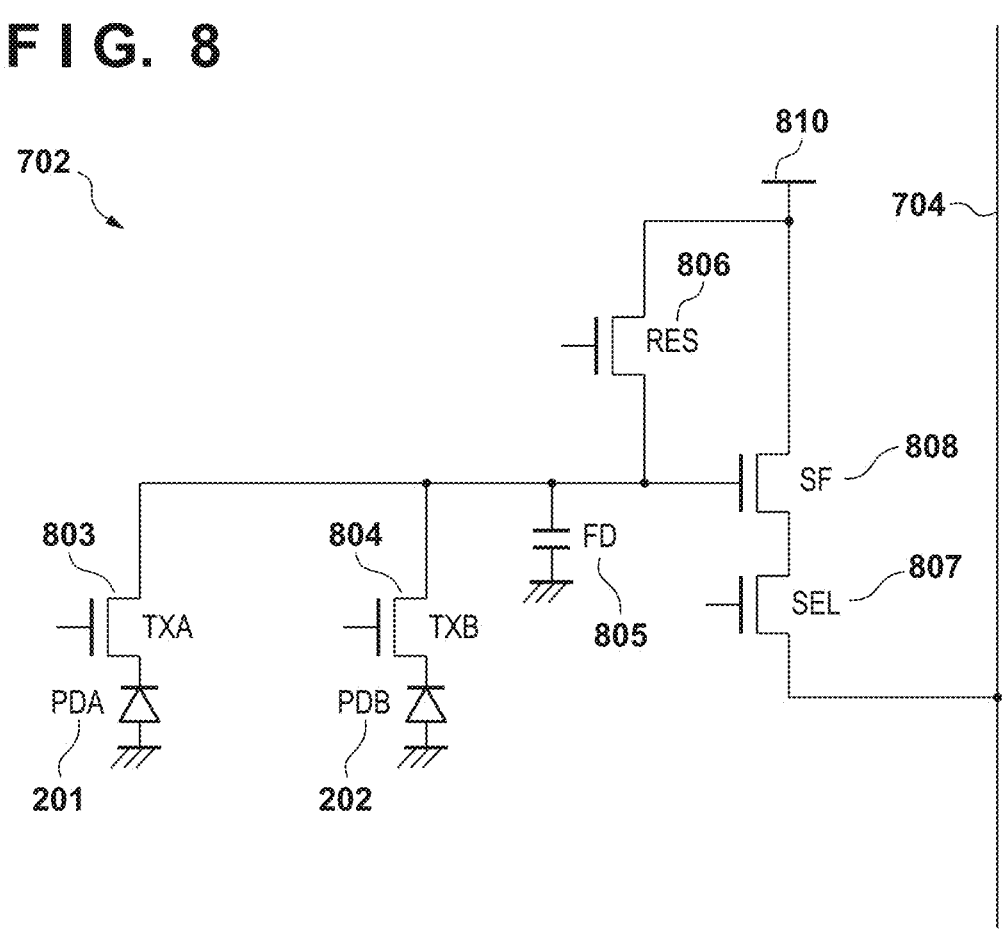
FIG. 8 is an equivalent circuit diagram of a pixel portion of an image capturing element.

FIG. 8 schematically illustrates an equivalent circuit of the pixel 702 of the image capturing element 107.

The pixel 702 has the first focus detection pixel (first photoelectric conversion element, denoted PDA in the following) 201, the second focus detection pixel (second photoelectric conversion element, denoted PDB in the following) 202, which are described above, and a charge-voltage conversion unit (denoted FD in the following) 805 that converts signal charge into voltage. In addition, the pixel 702 has a transfer switch (denoted TXA in the following) 803 for transferring a signal charge accumulated in the PDA 201 to the FD 805, and a transfer switch (denoted TXB in the following) 804 for transferring a signal charge accumulated in the PDB 202 to the FD 805. In addition, the pixel 702 has a reset switch (denoted RES in the following) 806 for discharging and resetting signal charges of the PDA 201, the PDB 202, and the FD 805, and a selection switch (denoted SEL in the following) 807 for selecting a pixel. Furthermore, the pixel 702 has an amplification transistor (denoted SF in the following) 808 that outputs a signal voltage from a pixel, the column output lines 704, and a constant-voltage power supply 810. Here, the gates of the TXA 803, the TXB 804, the RES 806, and the SEL 807 are respectively connected to the pixel driving pulse wiring line 703.

Note that, although the present embodiment forms the photoelectric conversion unit with an N-type semiconductor and separates signal charges by a P-type semiconductor with electrons serving as the signal charge to be accumulated in the photoelectric conversion unit, the photoelectric conversion unit may be formed by a P-type semiconductor and the signal charges may be separated by an N-type semiconductor with holes serving as the signal charges.

[Signal Addition Circuit]

Figure 9:
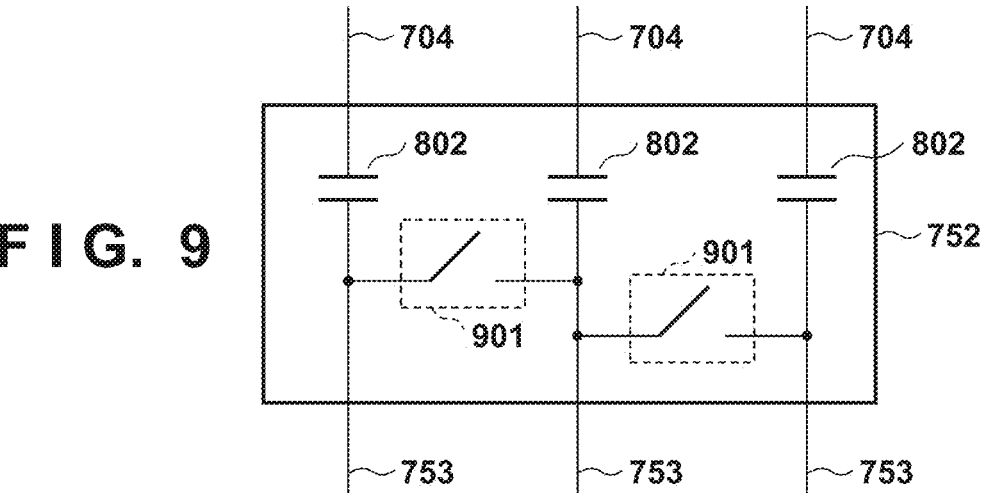
FIG. 9 illustrates a configuration of a signal addition circuit of an image capturing element.

FIG. 9 schematically illustrates a configuration of the signal addition circuit.

The signal addition circuit 752 includes three coupling capacitors 802 and an addition switch 901 that can connect the AD input lines 753 to each other on the AD conversion circuit 713 side of the coupling capacitors 802. Among the electrodes of the coupling capacitors 802, an electrode on the side where the addition switch 901 is provided is connected to the AD input line 753, and an electrode on the opposite side across the capacitor is connected to the column output line 704. Here, although the signal addition circuit 752 is configured to add signals of every three columns in the present embodiment, the number of columns to be added is not limited thereto, and there is conceivable a configuration that adds signals of two or more columns (N columns or more: N being an integer of 2 or more).

In the case of a non-addition read mode described below, the addition switch 901 has been turned off and voltages across three column output lines 704 are directly output to three AD input lines 753. Additionally, in the case of an addition read mode described below, the addition switch 901 has been turned on and an averaged voltage of the voltages across the three column output lines 704 is output to the three AD input lines 753.

[AD Conversion Unit]

FIG. 10 schematically illustrates the AD conversion circuits 713 serving three columns.

The AD conversion method is a single-slope AD conversion method, and the AD conversion circuit 713 includes a comparator 1001 and a latch unit 1002. The input ends of the comparator 1001 receive inputs of a signal from the AD input line 753 and a reference signal, and the output of the comparator 1001 is inverted when the voltage levels of the two input signals are reversed. The latch unit 1002 receives input of a count signal corresponding to the time elapsed since the start of AD conversion, and the count signal is held in the latch unit 1002 at a timing when the output of the comparator 1001 is inverted (timing at which the voltage of the pixel signal and the voltage of the reference signal are equalized). After completion of AD conversion, the held signal is output to the output unit 741.

In addition, the comparator 1001 and the latch unit 1002 have a power-down control signal input thereto and, when the power-down control signal is at a High level, the comparator 1001 and the latch unit 1002 will be turned off (power supply terminated) or receive a reduced amount of electric current. It is therefore possible to suppress power consumption of the comparator and the latch unit while the AD operation is not being performed.

[First Read Mode: Non-Addition Read Mode]

Next, referring to FIG. 11, there will be described a drive timing in the non-addition read mode, which is the first read mode of the pixel signal. A high-resolution signal can be acquired in the non-addition read mode.

Figure 11:
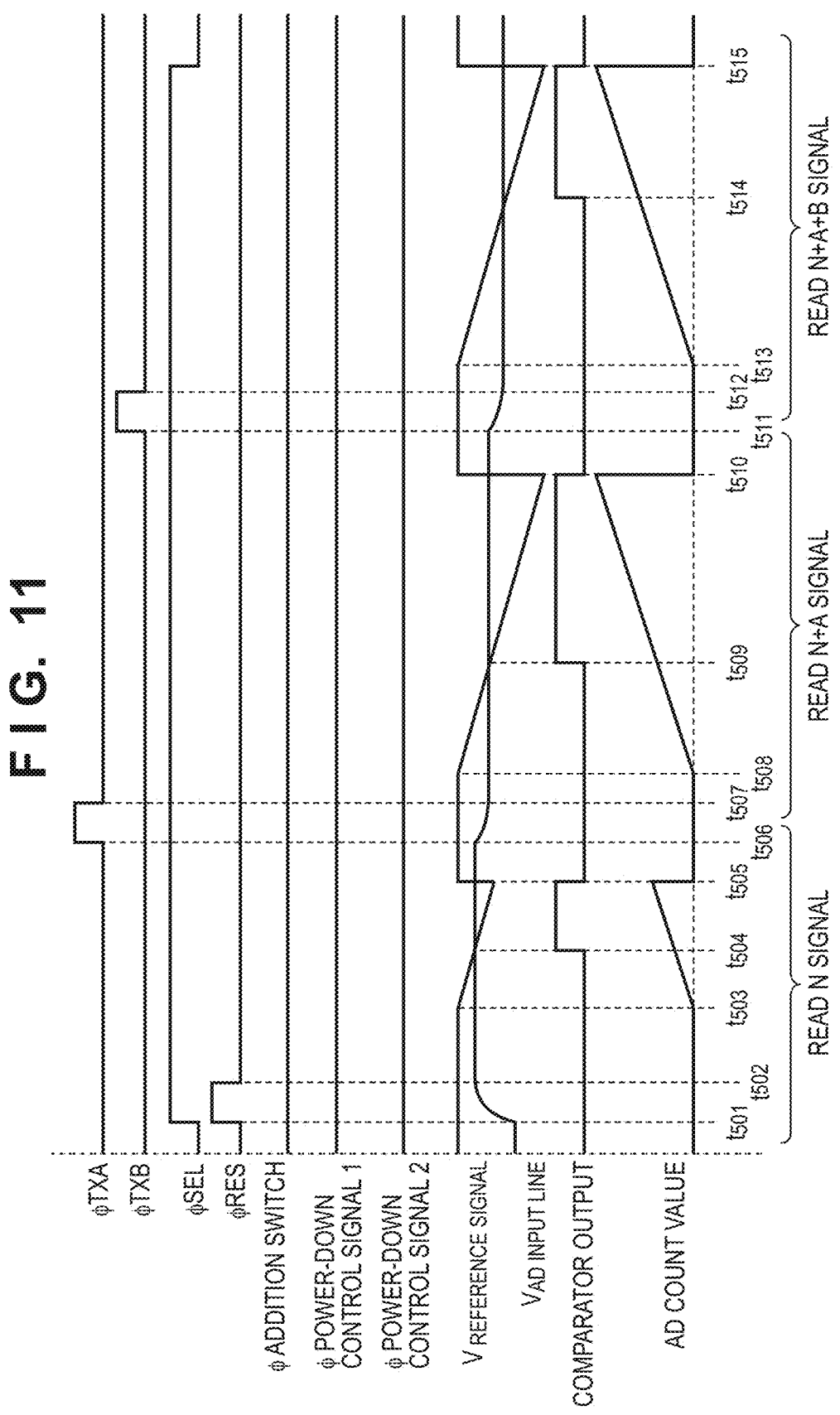
FIG. 11 is a read timing chart in a non-addition read mode of an image capturing element.

The positions t501 to t515 in FIG. 11 indicate respective timings (time points). In addition, a φSEL indicates a control signal of the SEL 807 such that the SEL 807 is turned on when the φSEL is at a HIGH level, and the SEL 807 is turned off when the φSEL is at a LOW level. The same applies to other switches.

The "VAD input line" illustrated in FIG. 11 indicates how the voltage across the AD input line 753 changes, and the "V reference signal" indicates how the voltage of the reference signal changes. Here, in the non-addition read mode, the column output lines 704 and the AD input lines 753 are in a one-to-one correspondence, and there is no position dependency in the signal addition circuit 752. In addition, the reference signals a to c in the non-addition read mode (see FIG. 10) use the same signal for each column. Therefore, one of the "VAD input lines" indicating the voltage across the AD input line 753 and one of the "V reference signals" indicating the reference signal voltage will be described in FIG. 11 as representatives thereof.

Reading the pixel signal includes reading an N signal, reading an N+A signal, and reading an N+A+B signal. The N signal is a signal corresponding to the voltage of the FD 805 before transferring the charge accumulated in the PDA 201 and the PDB 202. The N+A signal is a signal corresponding to the voltage of the PDA 201 after having transferred the charge accumulated in the FD 805. Furthermore, the N+A+B signal is a signal corresponding to the voltage of the FD 805 after having transferred the charge accumulated in the PDA 201 and the PDB 202. The signal reading operation will be described below, referring to the timing chart of FIG. 11.

<N Signal Reading (Time Points t501 to t506)>

At a time point t501, SEL 807 is turned on to connect SF 808 to the column output line 704. Furthermore, at time points t501 and t502, the RES 806 is turned on and off, and FD 805 is brought back to the reset voltage before charge transfer. The VAD input line indicating the voltage across the AD input line 753 turns out to be a voltage (reset signal) corresponding to the FD reset voltage.

After the AD input line 753 has settled, the AD counter 714 is driven at a time point t503 to increment the count value at a constant time interval. Simultaneously, the reference signal generation circuit 712 outputs a reference signal so that the amount of change (slope) of the voltage of the reference signal with respect to the time or the count value becomes constant (time points t503 to t505). In the present embodiment, the aforementioned period (time points t503 to t505) is referred to as an N conversion period. Here, although the reference signal is reduced from a high voltage in order to accumulate electrons in the photoelectric conversion unit (denoted PD in the following) in the present embodiment, the reference signal may be raised from a low voltage in a case where holes are accumulated in the PD.

When the V reference signal and the VAD input line exhibit the same voltage at the time point t504, the output of the comparator 1001 is inverted and the count value of the AD counter 714 is held in the latch unit 1002 as the N signal. It is assumed in the present embodiment that the AD counter 714 is a common circuit configured to transmit the count value to the latches of respective columns. However, it is also conceivable to provide AD counters in respective columns and transmit the clock signal to count the time until the comparator 1001 is inverted.

<N+A Signal Reading (Time Points t506 to t511)>

Subsequently, at time points t506 and t507, the TXA 803 is turned on/off to transfer the charge accumulated in the PDA 201 to the FD 805. Voltage of the FD 805 drops as much as a voltage approximately proportional to the number of transferred charges (ΔVFD), and the VAD input line indicating the voltage across the AD input line 753 also drops as much as the voltage approximately proportional to ΔVFD. In other words, the ΔVAD input line indicating the amount of voltage drop across the AD input line 753 indicates a voltage approximately proportional to the amount of light incident on the PDA 201.

Subsequently, the AD counter 714 is driven to increment the count value at a constant time interval, similarly to the N conversion period, and the reference signal generation circuit 712 outputs the reference signal so that the inclination of the reference signal becomes constant (time points t508 to t510). In the present embodiment, the period (time points t508 to t510) is referred to as an N+A conversion period. The N+A conversion period is set to be longer than the N conversion period.

When the V reference signal and the VAD input line exhibit the same voltage at the time point t509, the output of the comparator 1001 is inverted and the count value of the AD counter 714 is held in the latch unit 1002 as the N+A signal.

<N+A+B Signal Reading (Time Points t511 to t515)>

Subsequently, at the time points t511 and t512, the TXB 804 is turned on/off to transfer the charge accumulated in the PDB 201 to the FD 805. The voltage of the FD 805 and voltage across the AD input line 753 respectively drop as much as a voltage approximately proportional to the number of transferred charges. Similarly to the N+A signal, the ΔVAD input line indicating the amount of voltage drop across the AD input line 753 becomes a voltage approximately proportional to the amount of light incident on the PDB 202.

Subsequently, the AD counter 714 is driven to increment the count value at a constant time interval, similarly to the N+A conversion period, and the reference signal generation circuit 712 outputs the reference signal so that the inclination of the reference signal becomes constant (time points t513 to t515). In the present embodiment, the period (time points t513 to t515) is referred to as an N+A+B conversion period. Although the N+A+B conversion period is set to the same time length as the N+A conversion period in the present embodiment, the N+A+B conversion period may be set to be longer than the N+A conversion period.

When the V reference signal and the VAD input line exhibit the same voltage at time point t514, the output of the comparator 1001 is inverted and the count value of the AD counter 714 is held in the latch unit 1002 as the N+A+B signal.

A signal A corresponding to the signal charge amount accumulated in the PDA 201 can be acquired from the difference between the N signal and the N+A signal acquired in the aforementioned manner. In addition, it is possible to acquire a signal B corresponding to the signal charge amount accumulated in the PDB 202 from the difference between the N+A signal and the N+A+B signal. The difference calculation may be performed in the AD conversion unit 711, or may be performed after the signals have been output from the image capturing element 107. A phase difference signal can be acquired by using both the signal A and the signal B, and an image capturing signal can be acquired by adding the signal A and the signal B.

[Second Read Mode: Addition Read Mode]

Next, referring to FIGS. 12A and 12B, there will be described a drive timing in the addition read mode, which is the second read mode of the pixel signal. Description of parts similar to those in the non-addition read mode will be omitted, and parts specific to the addition mode will be described. The addition read mode allows for improving the S/N ratio of the signal while suppressing power consumption compared to the non-addition read mode in exchange for sacrificing the resolution.

Figure 12B:
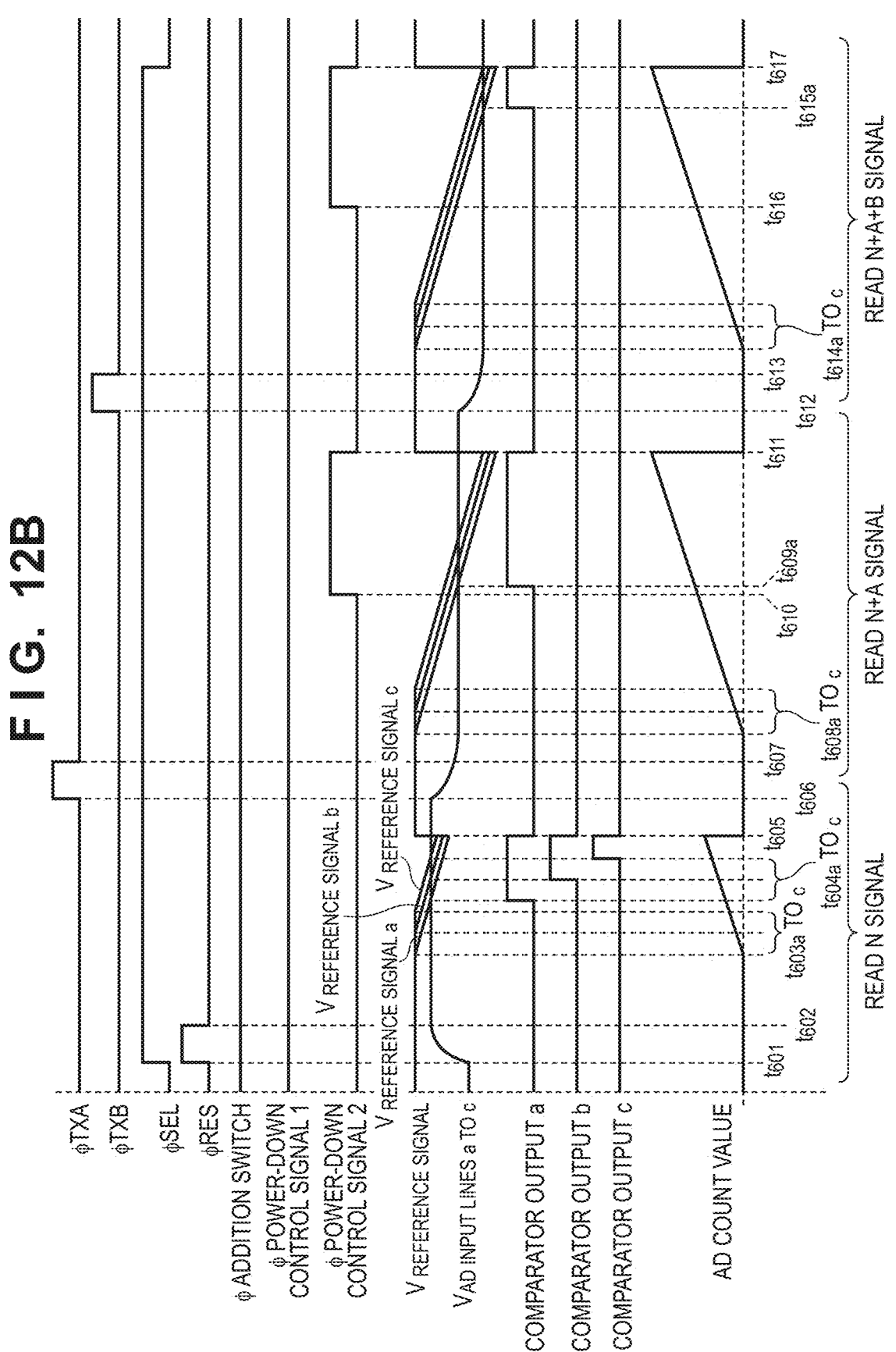
FIG. 12B is a read timing chart in an addition read mode of an image capturing element.

FIG. 12A is a timing chart for a case where the amount of received light is small in the addition read mode and therefore the amount of charge accumulated in the PDA 201 and the PDB 202 is small. In addition, FIG. 12B is a timing chart for a case where a large amount of charge has been accumulated in the PDA 201 and the PDB 202.

When the amount of received light is small, the S/N ratio of the signal is more susceptible to dark random noise (DRN) that occurs in reading than when the amount of received light is large, and therefore reduction of DRN is effective for improving the S/N ratio of the signal. When, on the other hand, the amount of received light is large, the S/N ratio of the signal is rate-limited by optical shot noise, and therefore the S/N ratio of the signal does not significantly change when the DRN increases.

In the addition mode, reference signals a, b and c (see FIG. 10) are generated so that start timings of voltage drops (temporal changes of voltage) are different from each other. More specifically, the voltage starts dropping in the order of the reference signal a, the reference signal b and the reference signal c, as indicated by time points t603a, t603b and t603c. The foregoing is performed in order to shift the inversion timing of the comparator 1001 described below. Alternatively, the inversion timing may be shifted in another manner such as shifting the reset voltage level of the comparator 1001, or shifting the start timing of the operation.

With the addition switch 901 in the signal addition circuit 752 being turned on in the addition mode, an averaged voltage of the voltages across the column output lines 704 is input to the three comparators.

During the N conversion period, an averaged signal of the output voltages of the three pixels and the reference signal are input to the comparators 1001(a), 1001(b) and 1001(c) (see FIG. 10). The reference signals a, b and c are temporally shifted from each other, whereby the inversion timings of the comparators 1001(a), 1001(b) and 1001(c) are different from each other as indicated by time points t604a, t604b and t604c. The count values of the AD counter 714 at respective timings are stored in respective latch units 1002(a), 1002(b) and 1002(c) thereof (see FIG. 10) as an N signal a, an N signal b, and an N signal c.

During the N+A conversion period and during the N+A+B period, a power-down control signal 2 causes the AD conversion unit 713(b) and the AD conversion unit 713(c) to be powered down, thereby suppressing (reducing) power consumption. In addition, similarly to during the N conversion period, the temporally shifted reference signals are input to the comparators 1001(a), 1001(b) and 1001(c). Therefore, when the amount of received light is small, the outputs of the comparators 1001(a), 1001(b) and 1001(c) are inverted at time points t609a to 609c and time points t615a to 615c as illustrated in FIG. 12A, whereby the N+A signal a, the N+A signal b, the N+A signal c, the N+A+B signal a, the N+A+B signal b, and the N+A+B signal c are acquired. When the amount of received light is small, the AD conversion unit 713(b) and the AD conversion unit 713(c) are powered down after acquisition of these signals, and therefore a signal with a good S/N ratio can be acquired even when the amount of received light is small.

When, on the other hand, the amount of received light is large, the timing at which the voltage across the AD input line 753 and the voltage of the reference signal are inverted is later than the timing at which the power-down control signal 2 is turned on (time point t610 and time point t616). Therefore, as illustrated in FIG. 12B, the comparators 1001(b) and 1001(c) which have been powered down by the power-down control signal 2 are not inverted, and only the comparator 1001(a) is inverted (time point t609a, time point t615a). Accordingly, only the N+A signal a and the N+A+B signal a are acquired.

In the following, there will be described a method of calculating, from the signals acquired as described above, a signal A3pix corresponding to the amount of signal charge accumulated in the PDA 201 across three pixels, and a signal B3pix corresponding to the amount of signal charge accumulated in the PDB 202 across three pixels.

The signal A3pix is calculated, only for AD converters having acquired N+A signals, by summing the values calculated by subtracting N signals from N+A signals, and subsequently multiplying the sum by a value α calculated by dividing 3 by the number of acquisitions of A signals. Specifically, the calculation is expressed as follows.

Signal $A3pix = \{([N + A \text{ signal } a] - [N \text{ signal } a]) + \qquad$ Equation (1)

$\qquad ([N + A \text{ signal } b] - [N \text{ signal } b]) +$ $\qquad\qquad ([N + A \text{ signal } c] - [N \text{ signal } c])\} \times \alpha$ $\alpha = 3 \div (\text{number of acquisitions of } N + A \text{ signals}) \qquad$ Equation (2)

In addition, the signal B3pix is similarly calculated, only for AD converters having acquired N+A+B signals, by summing the values calculated by subtracting N+A signals from N+A+B signals, and subsequently multiplying the sum by a value β calculated by dividing 3 by the number of acquisitions of A+B signals. Specifically, the calculation is expressed as follows.

Signal $B3pix = \{([N + A + B \text{ signal } a] - [N + A \text{ signal } a]) + \qquad$ Equation (3)

$\qquad ([N + A + B \text{ signal } b] - [N + A \text{ signal } b]) +$ $\qquad\qquad ([N + A + B \text{ signal } c] - [N + A \text{ signal } c])\} \times \beta$ $B = 3 \div (\text{number of acquisitions of } N + A + B \text{ signals}) \qquad$ Equation (4)

[Accuracy of Phase Difference AF Signal]

Here, the accuracy of phase difference AF will be described.

In phase difference AF, a focus shift amount (referred to as defocus amount) is calculated by calculating (referred to as correlation calculation in the following) a shift amount between images of the signal A and the signal B (referred to as phase difference signal in the following), and multiplying the image shift amount by a conversion coefficient. On this occasion, the signal A and the signal B to be used for correlation calculation may be respectively used after having signals for a plurality of pixels added thereto. Therefore, the higher the S/N of the added phase difference signal, the higher the calculation accuracy of the defocus amount of the phase difference AF becomes.

Here, the S/N ratio with respect to signals of three pixels in the non-addition read mode and the addition read mode is compared with the S/N ratio of the phase difference signal for a case of low illuminance susceptible to the effect of Dark Random Noise (DRN).

<Non-Addition Read Mode>

Letting σpix the noise generated in a single pixel portion and σADC denote the noise generated in a single AD conversion unit, the read noise in the signal per pixel or per AD converter in the non-addition read mode is expressed as follows.

$\sigma = (\text{non-addition, single signal}) = (\sigma pix^2 + \sigma ADC^2)^{1/2} \qquad$ Equation (5)

The total read noise of the signals of the three pixels is expressed as follows due to lack of any correlation between respective noises.

$\sigma = (\text{non-addition, 3 pixels}) = (3\sigma pix^2 + 3\sigma ADC^2)^{1/2} \qquad$ Equation (6)

<Addition Read Mode>

In the addition read mode, the voltage at the input end of the AD conversion circuit has an averaged value of voltages across three pixels. In addition, the noises of the pixels at the input end of the AD conversion circuit is expressed as follows due to lack of any correlation between each other.

$$(3 \times \sigma pix^2)^{1/2} / 3 = 1 / (3^{1/2}) \times \sigma pix$$

Therefore, the read noise in the signal per AD converter is expressed as follows.

$$\sigma(\text{addition, single pixel}) = (1/3 \times \sigma pix^2 + \sigma ADC^2)^{1/2} \qquad \text{Equation (7)}$$

In addition, the reference signal is temporally shifted in the aforementioned addition read mode, and therefore the timing at which the comparator in each AD converter is inverted is also shifted. The total read noise of signals across three pixels is expressed as follows, for a case where respective AD converter inversion timings are sufficiently separated to an extent that allows for determining that the correlation between pixel noises disappears.

$$\sigma(\text{addition, 3 pixels}) = (\sigma pix^2 + 3\sigma ADC^2)^{1/2} \qquad \text{Equation (8)}$$

From Equations (6) and (8), Dark Random Noise (DRN) in the addition read mode is lower than DRN in the non-addition read mode under low illuminance with a small amount of received light.

On the other hand, it is possible to cause a power-down without using some of the AD conversion circuits instead of using all the AD conversion circuits, whereby power consumption can be suppressed under high illuminance with a large amount of received light and a small influence of DRN. In addition, it is desirable to set the timing of turning on the power-down switch to a timing at which the value of σ (addition, three pixels) becomes equal to the optical shot noise. In other words, it is desirable to turn on the power-down switch at a timing delayed from the start timing of the AD conversion by a time length corresponding to the time length required for performing AD conversion on the pixel signal acquired for a received light amount at which the level of dark random noise and the level of optical shot noise are equalized. It is therefore desirable to delay the timing of turning on the power-down switch later than the timing of low-sensitivity (low ISO sensitivity) reading for high-sensitivity (high ISO sensitivity) reading that provides a larger analog gain.

In addition, although description has been provided for a configuration in which two out of three AD converters are simultaneously powered down in the present embodiment, the AD converters may be powered down one by one in a stepwise manner. In addition, the power-down signal need not be turned on for both N+A signal reading and N+A+B signal reading in a case such as when there is margin in power consumption.

In addition, the power-down switch may be turned on only when reading the N+A+B signal without turning on the power-down switch when reading the N+A signal, depending on the time required to restart the AD converter that has been powered down. The aforementioned configuration is more effective in a case where the read time per row is longer than the sum of the N signal read time, the N+A signal read time, and the N+A+B signal read time, such as when reading with a same read time per row as in other read modes.

As has been described above, the aforementioned embodiment allows for reducing power consumption while suppressing reduction of the S/N performance of the output signal, regardless of the incident luminance.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-118517, filed Jul. 20, 2023, which is hereby incorporated by reference herein in its entirety.

What is claimed is:

1. An image capturing apparatus comprising:
   a pixel portion in which pixels each including a photoelectric conversion element are arranged in a matrix;
   an AD converter arranged corresponding to each pixel column of the pixel portion and configured to convert a pixel signal acquired from the pixels into a digital signal;
   an addition circuit configured to add pixel signals of different N columns (N being an integer of 2 or more); and
   at least one processor configured to function as:
   a control unit configured to use a plurality of AD converters corresponding to the N columns to perform AD conversion on the pixel signals added by the addition circuit, and, during the AD conversion, after a predetermined time has elapsed from start of the AD conversion, perform a control to switch some of the plurality of AD converters to an operation that reduces power consumption,
   wherein the control unit sets the predetermined time based on a level of dark random noise and a level of optical shot noise in the pixel signal.

2. The image capturing apparatus according to claim 1, wherein the AD converter includes a comparison circuit configured to compare the pixel signal with a reference signal whose value changes in accordance with a predetermined gradient with respect to time, and a count circuit configured to count time until voltage of the pixel signal and voltage of the reference signal are equalized, and the control unit reduces power supply to the comparison circuit and the count circuit in the operation of reducing power consumption.

3. The image capturing apparatus according to claim 2, wherein the control unit terminates power supply to the comparison circuit and the count circuit in the operation of reducing power consumption.

4. The image capturing apparatus according to claim 1, wherein the control unit sets the predetermined time to a time corresponding to a time required for performing AD conversion on a pixel signal acquired for a light reception amount at which the level of dark random noise and the level of optical shot noise are equalized.

5. The image capturing apparatus according to claim 1, wherein the control unit sets the predetermined time to be longer for a higher ISO sensitivity.

6. The image capturing apparatus according to claim 2, wherein the control unit performs control to shift timings at which the voltage of the pixel signal and the voltage of the reference signal are equalized in the plurality of AD converters.

7. The image capturing apparatus according to claim 2, wherein the control unit shifts the start timings of the operation of the comparison circuit respectively by a predetermined time in the plurality of AD converters.

8. The image capturing apparatus according to claim 2, wherein the control unit shifts the start timings of temporal changes of the reference signals to be input to the plurality of AD converters respectively by a predetermined time.

9. The image capturing apparatus according to claim 1, wherein the pixels each include a plurality of photoelectric conversion elements configured to receive light flux respectively passing through different pupil regions of an imaging optical system.

10. The image capturing apparatus according to claim 9, wherein the control unit reads a reset signal from the pixel, reads signals from some of the plurality of photoelectric conversion elements, and reads signals from all of the plurality of photoelectric conversion elements, sequentially, and the control unit performs a control to switch some of the plurality of AD converters to an operation for reducing power consumption when reading signals from the some of photoelectric conversion elements.

11. The image capturing apparatus according to claim 10, wherein the control unit performs a control to switch some of the plurality of AD converters to an operation of reducing power consumption when reading signals of all the photoelectric conversion elements.

12. A method of controlling an image capturing apparatus comprising:
   a pixel portion in which pixels each including a photoelectric conversion element are arranged in a matrix;

an AD converter arranged corresponding to each pixel column of the pixel portion and configured to convert a pixel signal acquired from the pixels into a digital signal; and an addition circuit configured to add pixel signals of different N columns (N being an integer of 2 or more), the method comprising:

using a plurality of AD converters corresponding to the N columns to perform AD conversion on the pixel signals added by the addition circuit, and, during the AD conversion, after a predetermined time has elapsed from start of the AD conversion, performing a control to switch some of the plurality of AD converters to an operation that reduces power consumption, wherein the predetermined time is set based on a level of dark random noise and a level of optical shot noise in the pixel signal.

13. The method according to claim 12, wherein the AD converter includes a comparison circuit configured to compare the pixel signal with a reference signal whose value changes in accordance with a predetermined gradient with respect to time, and a count circuit configured to count time until voltage of the pixel signal and voltage of the reference signal are equalized, and the control unit reduces power supply to the comparison circuit and the count circuit in the operation of reducing power consumption.

14. The method according to claim 12, wherein the predetermined time is set to a time corresponding to a time required for performing AD conversion on a pixel signal acquired for a light reception amount at which the level of dark random noise and the level of optical shot noise are equalized.

15. The method according to claim 12, wherein the predetermined time is set to be longer for a higher ISO sensitivity.

16. A non-transitory computer-readable storage medium storing a program for causing a computer to execute a control method of an image capturing apparatus comprising:

a pixel portion in which pixels each including a photoelectric conversion element are arranged in a matrix;

an AD converter arranged corresponding to each pixel column of the pixel portion and configured to convert a pixel signal acquired from the pixels into a digital signal; and an addition circuit configured to add pixel signals of different N columns (N being an integer of 2 or more), the method comprising:

using a plurality of AD converters corresponding to the N columns to perform AD conversion on the pixel signals added by the addition circuit, and, during the AD conversion, after a predetermined time has elapsed from start of the AD conversion, performing a control to switch some of the plurality of AD converters to an operation that reduces power consumption, wherein the predetermined time is set based on a level of dark random noise and a level of optical shot noise in the pixel signal.

17. The non-transitory computer-readable storage medium according to claim 16, wherein the AD converter includes a comparison circuit configured to compare the pixel signal with a reference signal whose value changes in accordance with a predetermined gradient with respect to time, and a count circuit configured to count time until voltage of the pixel signal and voltage of the reference signal are equalized, and the control unit reduces power supply to the comparison circuit and the count circuit in the operation of reducing power consumption.

18. The non-transitory computer-readable storage medium according to claim 16, wherein the predetermined time is set to a time corresponding to a time required for performing AD conversion on a pixel signal acquired for a light reception amount at which the level of dark random noise and the level of optical shot noise are equalized.

19. The non-transitory computer-readable storage medium according to claim 16, wherein the predetermined time is set to be longer for a higher ISO sensitivity.

* * * * *